United States Patent [19]

Townsend et al.

[11] Patent Number: 4,594,633

[45] Date of Patent: Jun. 10, 1986

[54] INTEGRATED CIRCUIT PROTECTION CIRCUIT

[75] Inventors: Greg M. Townsend, Palatine; James A. Henderson, Jr., Streamwood, both of Ill.

[73] Assignee: Motorola, Inc., Schaumburg, Ill.

[21] Appl. No.: 511,684

[22] Filed: Jul. 7, 1983

[51] Int. Cl.⁴ .......... H02H 9/02

[52] U.S. Cl. .......... 361/57; 361/93

[58] Field of Search .......... 361/18, 91, 56, 71, 361/75, 93, 98, 100, 101, 57, 74; 323/276, 277, 278

[56] References Cited

U.S. PATENT DOCUMENTS

| | | | |
|---|---|---|---|
| 3,332,006 | 7/1967 | Worrell et al. | 361/18 |
| 3,553,530 | 1/1971 | Gregson . | |
| 3,573,553 | 4/1971 | Mietz | 361/74 |
| 3,832,573 | 8/1974 | Ver Planck et al. . | |
| 3,988,643 | 10/1976 | Morris | 323/277 |
| 4,012,683 | 3/1975 | Ferro et al. . | |
| 4,040,116 | 8/1977 | Sheldon . | |
| 4,127,885 | 11/1978 | Adam et al. . | |
| 4,322,770 | 3/1982 | Sendelweck . | |
| 4,351,021 | 9/1982 | Morihisa et al. . | |
| 4,353,105 | 10/1982 | Black | 361/101 |

OTHER PUBLICATIONS

"SCR Latch-Up" ICAN-6525, RCA COS/MOS Integrated Circuit Book, Aug. 1978, p. 621.

*Primary Examiner*—A. D. Pellinen
*Assistant Examiner*—H. L. Williams
*Attorney, Agent, or Firm*—Donald B. Southard

[57] ABSTRACT

An integrated circuit protection device for use with a voltage regulator used to drive an integrated circuit to prevent damage to the integrated circuit which goes into a "latch up" condition. The integrated circuit protection device comprises a first switching circuit, connected to the output of the voltage regulator for selectively connecting the output of the voltage regulator to ground and a second switching circuit, connected to the input and the output of the voltage regulator and to the first switching circuit, for detecting a "latch up" condition and for selectively activating the first switching circuit upon detection of a "latch up" condition, whereby the first switching circuit connects the output of the voltage regulator to ground and resets the integrated circuit to prevent damage thereto. A predetermined time after the "latch up" condition is detected, normal operation is automatically restored. In another embodiment, the first switching circuit is included in an adjustable voltage regulator, but is still controlled by the second switching circuit as described hereinbefore. In still another embodiment the protection circuit monitors the input current drawn by a voltage regulator and cuts the current thereto when the current exceeds a predetermined value caused by the "latch up" condition of the integrated circuit. The output of the voltage regulator drops to zero and clears the integrated circuit.

19 Claims, 3 Drawing Figures

INTEGRATED CIRCUIT PROTECTION CIRCUIT

BACKGROUND OF THE INVENTION

1. Field of the Invention

The present invention relates to electrical circuits and more particularly to an integrated circuit protection circuit which prevents damage to an integrated circuit due to transient surges or electrostatic discharges and which clears the integrated circuit of a "latch up" condition or SCR mode.

2. Description of the Prior Art

In the fabrication of integrated circuits, an epitaxial layer doped with one ion type (i.e. N-type of P-type) is grown on the surface of a substrate doped with the other ion type (i.e. P-type or N-type) and then various impurities are diffused into the epitaxial layer to create the requisite elements (e.g. the gate, channel, etc.) of the desired electronic device. The diffusion process, in addition to forming the desired electronic device, also can create what is well known in the art as a parasitic transistor which may exist between a diffusion region, the epitaxial layer and the substrate. When a CMOS inverter stage is formed a pair of parasitic transistors are formed which have the configuration of a silicon controlled rectifier (SCR) circuit. The parasitic transistors remain inactive during the normal operation of the integrated circuit and therefore generally do not have an effect on the operation of the integrated circuit. However, a transient surge or electrostatic discharge may change the relative electrical characteristics of one or more of the several diffusion regions enough so that the regions which comprise the parasitic SCR circuit become conductive and current passes through portions of the various layers of the integrated circuit unintended for such current flow. Such a phenomenon is referred to as a "latch up" condition or SCR mode (hereinafter referred to as a "latch up" condition). The "latch up" condition can be especially destructive to CMOS integrated circuits, since they and their associated components are designed to normally draw small quantities of current. An integrated circuit may be cleared of the "latch up" condition by reducing the input voltage or current below the sustaining voltage or sustaining current, respectively, the value of which may vary according to the integrated circuit being used. A more detailed description of "latchup" may be found in RCA CMOS DATA BOOK, Integrated Circuit Application Note (ICAN) 6525.

When a "latch up" condition occurs, the integrated circuit appears as a very low impedance across the output of a voltage regulator which may be used to drive the integrated circuit. Thus, it not only becomes necessary to limit the current input to the integrated circuit for protection, but also to clear the integrated circuit of the "latch up" condition so that the integrated circuit may again function properly.

The present invention provides such a device which not only monitors the operation of the integrated circuit, but also drops the input current and/or input voltage below the sustaining current or sustaining voltage, respectively, of the integrated circuit for some predetermined time, thereby clearing the integrated circuit of the "latch up" condition.

SUMMARY OF THE INVENTION

Accordingly, one object of this invention is to provide a novel integrated circuit protection device which prevents damage to an integrated circuit which goes into a "latch up" condition.

It is another object of the present invention to provide an integrated circuit protection device which monitors the output of a voltage regulator driving an integrated circuit and provides a direct path to ground for the voltage regulator output when the voltage regulator output drops below a predetermined value.

It is still another object of the present invention to provide an integrated circuit protection device which monitors the input of a voltage regulator driving an integrated circuit and drops the input to the voltage regulator when the voltage regulator draws too much current resulting in a zero voltage regulator output.

It is yet another object of the present invention to provide an integrated circuit protection device which detects the "latch up" condition of an integrated circuit being driven by a voltage regulator.

It is yet still another object of the present invention to provide an integrated circuit protection device which clears the integrated circuit of the "latch up" condition upon detection of such a condition.

It is an additional object of the present invention to provide an integrated circuit protection device which enables the integrated circuit to resume normal operation upon correction of the "latch up" condition.

In order to accomplish the aforesaid objects, a unique integrated circuit protection device is presented. The integrated circuit protection device may be used in conjunction with a voltage regulator having a regulated output which drives the integrated circuit. The integrated circuit protection device comprises a first switching circuit connected to the output of the voltage regulator and ground and a second switching circuit which is connected to the input and the output of the voltage regulator as well as the first switching circuit. If the integrated circuit goes into a "latch up" condition, the second switching circuit detects a drop in the regulated output of the voltage regulator and as a result activates the first switching circuit which enables all of the current from the output of the voltage regulator to flow directly to ground. Therefore, damage to the integrated circuit due to excessive current is prevented. This operation also enables the "latch up" condition of the integrated circuit to be removed and normal operation of the integrated circuit may be resumed a predetermined time after elimination of the "latch up" condition.

In a similar embodiment, an adjustable voltage regulator may be used which contains the first switching circuit therein. Therefore, the only external components to the voltage regulator are those contained in the second switching circuit. The operation of the second embodiment is substantially the same as that described above, except that the activation of the first switching circuit turns the voltage regulator OFF.

In another embodiment, the integrated circuit protection device comprises a first switching circuit connected in series to the input of a voltage regulator driving an integrated circuit, a second switching circuit for controlling the first switching circuit and a third switching circuit for controlling the second switching circuit. The third switching circuit turns ON when the current drawn by the voltage regulator exceeds a predetermined value. When the third switching circuit turns ON, it turns the second switching circuit OFF which results in the first switching circuit being turned OFF.

The OFF condition of the first switching circuit results in no voltage or current being applied to the voltage regulator and its output drops to zero which operates to clear the "latch up" condition of the integrated circuit.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DESCRIPTION OF THE PREFERRED EMBODIMENTS

Figure 1:
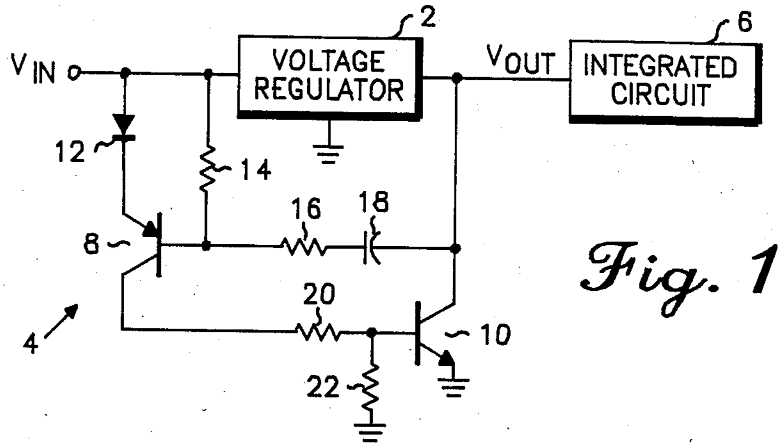
FIG. 1 is a schematic diagram of a first embodiment of the present invention.

Referring now to the drawings, wherein like reference numerals designate identical or corresponding parts throughout the several views, and more particularly to FIG. 1 thereof, the integrated circuit protection device of the present invention is illustrated. A voltage regulator 2 has its output voltage monitored by an integrated circuit protection circuit 4 and drives a CMOS integrated circuit 6. The protection circuit 4 comprises a PNP transistor 8 and an NPN transistor 10. The emitter of the transistor 8 is connected to the cathode of the diode 12 which has its anode connected to the input of the voltage regulator 2. The diode 12 is used for biasing purposes as well as to allow current flow in only one direction. The base of the transistor 8 is connected to the input of the voltage regulator 2 through the resistor 14. The base of the transistor 8 is also AC coupled to the output of the voltage regulator through the resistor 16 in series with the capacitor 18. The collector of the transistor 8 is connected to ground through the load resistors 20 and 22 and to the base of the transistor 10 through the resistor 20. The collector of the transistor 10 is connected to the output of the voltage regulator 2, its emitter being connected to ground and its base being connected to the load resistor 20.

The operation of the aforementioned device will be described hereinafter. The protection circuit 4 is used to monitor the regulated output voltage of the voltage regulator 2. Normally, if the CMOS integrated circuit 6 goes into a "latch up" condition, the CMOS integrated circuit appears as a very low impedance across the voltage regulator and therefore may draw several hundred milliamps which could ultimately damage the integrated circuit; however, when "latch up" occurs, the regulated output of the voltage regulator 2 will be reduced. Therefore, the transistor 8 is turned ON whenever the output of the voltage regulator drops by an amount greater than or equal to a predetermined threshold value as determined by the values R1 and R2 of the resistors 14 and 16, respectively. The threshold value may be calculated in accordance with the following equation:

$$\text{THRESHOLD} = \frac{R1 + R2}{R1} \times 1.4 \text{ volts}; \qquad (1)$$

Where the 1.4 volts is determined by the sum of the voltage drop across the diode 12 (0.7 volts) and the drop across the base-emitter junction of the transistor 8 (0.7 volts).

Therefore, if the regulated output voltage of the voltage regulator 2 drops by an amount greater than or equal to the threshold value as determined by the values R1 and R2 of the resistors 14 and 16, respectively, as illustrated in equation (1), the transistor 8 will turn ON and supply current from the input side of the voltage regulator 2 to the base of the transistor 10. The current from the transistor 8 turns the transistor 10 ON and momentarily connects the output of the voltage regulator 2 to ground. This results in sinking of all of the current from the output of the voltage regulator to ground, which clears the CMOS integrated circuit to a normal state. After a time delay (≃33 milliseconds in the preferred embodiment) determined by the value of the capacitor 18 and the resistor 16, the transistor 8 turns OFF which causes transistor 10 to turn OFF and removes the low from the voltage regulator 2 output. This results in the regulator output returning to its normal output voltage. Capacitor 18 then discharges to its quiescent state after which the protection circuit 4 is then ready to detect another drop in the output voltage of the voltage regulator 2. If another "latch up" condition occurs before the capacitor 18 successfully discharges, the voltage regulator 2 output will remain low indefinitely until the power to the voltage regulator is turned OFF and then restored.

Figure 2:
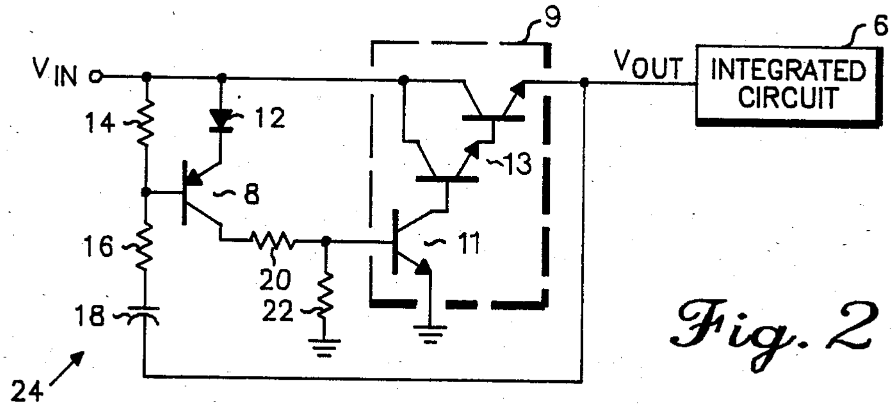
FIG. 2 is a schematic diagram of a second embodiment of the present invention.

Referring now to FIG. 2, another embodiment of the present invention is illustrated. The protection circuit 24 is substantially the same as the protection circuit 4 of FIG. 1, except that in this embodiment the voltage regulator 9 (a portion of which is shown enclosed by a broken line) is an adjustable voltage regulator such as a model MC1723 manufactured by Motorola, Inc. which includes the transistor 11 internally. The protection circuit 24 controls the operation of the transistor 11 in the same manner as the remaining components of the protection circuit 4 controls the transistor 10 as described hereinabove. However, when the transistor 11 turns ON, the base of the first stage of the Darlington pair 13 is shorted to ground. This turns the second stage of the Darlington pair 13 OFF which turns the voltage regulator OFF, cutting the power to the integrated circuit which enables it to be cleared of the "latch up" condition.

Figure 3:
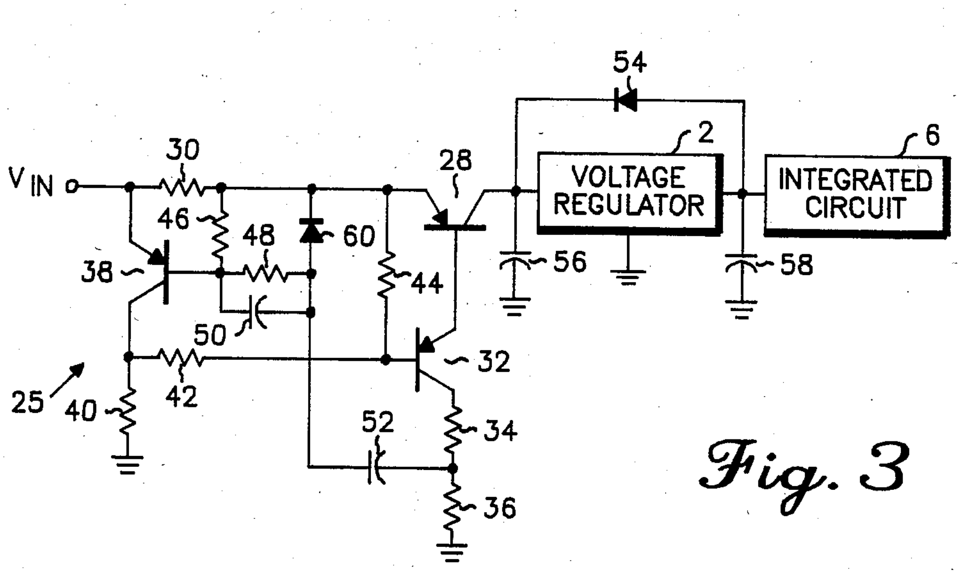
FIG. 3 is a schematic diagram of a third embodiment of the present invention.

Referring now to FIG. 3, still another embodiment of the present invention is illustrated. A three terminal positive voltage regulator 2 is again used to drive the CMOS integrated circuit 6 and includes the stabilizing filter capacitors 56 and 58 connected between ground and the input and output thereof, respectively, and a diode 54 having its cathode connected to the input and its anode connected to the output of the voltage regulator 2. Diode 54 provides an alternate current path around the voltage regulator 2 to prevent damage to the voltage regulator 2 in the event of excessive reverse current. The input to the voltage regulator 2 is monitored by the protection circuit 25. The protection circuit 25 comprises a PNP transistor 28 which has its collector connected directly to the input of the voltage regulator 2 and its emitter connected to the input voltage $V_{IN}$ through a resistor 30. The base of the transistor 28 is connected to the emitter of a PNP transistor 32 which has its collector connected to ground through the series resistors 34 and 36. A third PNP transistor 38 has its emitter connected to the input voltage $V_{IN}$ and its collector connected to ground through the resistor 40. The base of the transistor 38 is AC coupled to the junction of the resistors 34 and 36 by way of the parallel combination of the resistor 48 and capacitor 50 which is connected in series to the capacitor 52. The base of the transistor 38 is also connected to one end of the resistor 46 which has its other end connected to the resistor 30. Further, the base of the transistor 32 is connected to the emitter of the transistor 28 through the resistor 44 and is also connected to the collector of the transistor 38 through the resistor 42. A diode 60 has its cathode connected to the emitter of the transistor 28 and its anode connected to the junction of the resistor 48, the capacitor 50 and the capacitor 52.

During normal operation of the integrated circuits (i.e. when the voltage drop across the resistor 30 is less than 0.6 volts), the base-emitter junction of the transistor 38 is not forward biased and therefore the transistor 38 is turned OFF. As the input voltage $V_{IN}$ rises, the base-emitter junctions in both the transistor 28 and the transistor 32 become forward biased due to the resistor 30 and the resistors 40 and 42, respectively. As transistor 32 turns ON, it pulls current from the base of the transistor 28 and turns the transistor 28 on sufficiently hard to cause saturation. The transistor 28 then has a very small voltage drop across it and most of the input voltage $V_{IN}$ is supplied to the input of the voltage regulator 2. A voltage is developed between the resistors 34 and 36 due to the current through the transitor 32, which is AC coupled to the transistor 38 through the capacitor 52 and the parallel combination of the capacitor 50 and the resistor 48. Since the voltage across the resistor 36 is DC when normal level currents are being supplied to the voltage regulator 2, there is no path to turn on the transistor 38 and it remains off.

However, when the current through the resistor 30 reaches a level such that the voltage drop across the resistors 30 and 46 is greater than 0.6 volts such that the base-emitter junction is forward biased, the transistor 38 begins to turn ON and its collector sources current to the resistor 40. As the voltage across the resistor 40 increases, the current pull from the base of the transistor 32 through the resistor 42 decreases. This causes the transistor 32 to begin to turn OFF which causes less current to be drawn from the base of the transistor 28 causing the transistor 28 to also turn OFF. As the transistor 28 turns OFF, the voltage at the collector of the transistor 28 begins to drop which results in less voltage being passed to the voltage regulator 2. As the current through the transistor 32 decreases, the voltage across the resistor 36 drops and is coupled to the base of the transistor 38 which turns ON even harder. This positive feedback insures that the transistor 38 will supply enough current quickly to turn OFF both the transistors 28 and 32.

With the transistor 28 turned completely OFF, no voltage or current is applied to the voltage regulator 2 and its output will drop to zero. Therefore, if the cause of the excessive current drawn from the CMOS integrated circuit 6 is a "latch up" condition, the "latch up" condition of the CMOS integrated circuit 6 will be cleared during the OFF time (≈150 milliseconds).

Then, with the transitor 28 turned OFF, there is no excessive current passing through the resistor 30 to hold the transistor 38 ON. However, the transistor 38 is kept ON for a time period (≈150 milliseconds) determined by the RC time constant created by the capacitors 50 and 52 charged through the resistors 48 and 46, and the resistor 36, respectively. The aforesaid RC time constant must be sufficiently long enough for the filter capacitor 58 on the output of the voltage regulator 2 to be discharged before reenergizing the integrated circuit 6. The transistor 38 then begins to turn OFF which allows the transistors 28 and 32 to turn on as described hereinabove. If a low impedance load is still connected to the output of the voltage regulator 2, an excessive current is again detected and the aforementioned sequence will be repeated (i.e. the circuit oscillates) until the excessive current draw is eliminated.

It should also be noted that protection circuit 25 could also be connected between the output of the voltage regulator 2 and the input of the integrated circuit 6 and still operate to clear the integrated circuit 6 of the "latch up" condition.

Obviously, numerous (additional) modifications and variations of the present invention are possible in light of the above teachings. It is therefore to be understood that within the scope of the appended claims, the invention may be practiced otherwise than specifically described herein.

What is claimed as new and desired to be secured by Letters Patent of the United States is:

1. A protection device for an externally coupled integrated circuit having a first and second DC input terminal, comprising:

detecting means, operatively DC coupled to said integrated circuit at said DC input terminals, for detecting a "latch-up" condition in said integrated circuit;

switch means for effecting a low impedance across said DC input terminals; and clearing means operatively coupled to said detecting means and said switch means, for automatically clearing said integrated circuit of said "latch-up" condition for a predetermined period of time.

2. A device, according to claim 1, further comprising:

means, connected to said clearing means, for automatically restoring normal operation to said integrated circuit after said integrated circuit has been cleared of said "latch up" condition.

3. A device, according to claim 1, wherein:

said detecting means includes monitoring means for monitoring the input to said integrated circuit and a first switching means, connected to said monitoring means;

said monitoring means for activating said first switching means whenever the input to said integrated circuit is at such a level to indicate a "latch up" condition in said integrated circuit and said clearing means includes a second switching means, connected to said first switching means and said integrated circuit, for interrupting the input to said integrated circuit in response to said activated first switching means, whereby said integrated circuit is cleared of said "latch up" condition.

4. A device, according to claim 1, further comprising:

voltage regulator means, connected to said integrated circuit for driving said integrated circuit.

5. In combination with a voltage regulator for generating a regulated output voltage from a voltage input thereto and an integrated circuit connected to the output of said voltage regulator, an integrated circuit protection device, comprising:

first switching means, connected to the output of said voltage regulator, for selectively connecting the output of said voltage regulator to ground; and second switching means, connected to the input and the output of said voltage regulator and said first switching means, for detecting a "latch up" condition in said integrated circuit and selectively activating said first switching means, whereby said first switching means connects the output of said voltage regulator to ground and clears said integrated circuit of said "latch up" condition.

6. A device, according to claim 5, wherein:

said second switching means includes monitoring means for monitoring said regulated output and activating said second switching means whenever said regulated output voltage drops by a predetermined amount.

7. A device, according to claim 6, wherein:

said second switching means includes AC coupling means connected to the output of said voltage regulator.

8. A device, according to claim 5, wherein:

said first switching means is a transistor.

9. A device, according to claim 8, further comprising:

said second switching means including a second transistor, an RC circuit connected to the input and the output of said voltage regulator and to the base of said second transistor, a diode having one end connected to the input of said voltage regulator and the other end connected to the emitter of said second transistor, a first resistor connected to the collector of said second transistor and the base of said first transistor;

a second resistor, connected to the base of said first transistor and ground;

said first transistor having its collector connected to the output of said voltage regulator and its emitter connected to ground.

10. In combination with a voltage regulator for generating a regulated output voltage from a voltage input thereto having a first switching means for deenergizing said voltage regulator and an integrated circuit connected to the output of said voltage regulator, an integrated circuit protection device, comprising:

second switching means connected to the input, the output and the first switching means of said voltage regulator, for detecting a "latch-up" condition in said integrated circuit and selectively activating said first switching means, whereby said first switching means deenergizes said voltage regulator for a predetermined period of time whereby said integrated circuit is cleared of said "latch-up" condition.

11. A device, according to claim 10, wherein:

said first switching means includes a first transistor.

12. A device, according to claim 11, further comprising:

said second switching means includes a second transistor, an RC circuit connected to the input and the output of said voltage regulator and connected to the base of said second transistor, a diode having one end connected to the input of said voltage regulator and the other end connected to the emitter of said second transistor, a first resistor connected to the collector of said second transistor and the base of said first transistor, a second resistor, connected to the base of said first transistor and ground; and said first transistor having its collector connected internally to said voltage regulator and its emitter connected to ground.

13. In combination with a voltage regulator for generating a regulated output voltage from a voltage input thereto and having a first switching means for deenergizing said voltage regulator and an integrated circuit connected to the output of said voltage regulator, an integrated circuit protection device, comprising;

second switching means, connected to the input, the output and the first switching means of said voltage regulator, for detecting a "latch-up" condition in said integrated circuit and selectively activating said first switching means, whereby said first switching means de-engerizes said voltage regulator for a predetermined period of time whereby said integrated circuit is cleared of said "latch-up" condition, wherein; said second switching means includes monitoring means for monitoring said regulated output voltage and activating said first switching means whenever said regulated output voltage changes by a predetermined amount.

14. A device according to claim 13, wherein:

said second switching means includes AC coupling means connected to the output of said voltage regulator.

15. In combination with a voltage regulator for generating a regulated output from an input power source connected thereto and an integrated circuit connected to the output of said voltage regulator, an integrated circuit protection device, comprising:

first switching means, connected to said input power source and the input of said voltage regulator, for controlling the input power to said voltage regulator, said first switching means being normally closed when said integrated circuit is operating properly;

second switching means, connected to said first switching means, for controlling the state of said first switching means, said second switching means being normally closed when said integrated circuit is operating properly; and third switching means, connected to said input power source and said second switching means, responsive to the input to said voltage regulator for detecting a "latch up" condition of said integrated circuit and for controlling the state of said second switching means, said third switching means being normally open when said integrated circuit is operating properly and being closed whenever a "latch up" condition is detected, whereby the state of said second switching means is changed to open which changes the state of said first switching means to open when causes a zero output from said voltage regulator and clears said integrated circuit of said "latch up" condition for a predetermined period of time.

16. A device, according to claim 15, wherein:

said third switching means includes monitoring means for monitoring the input current to said voltage regulator and closing said third switching means whenever the input current to said voltage regulator exceeds a predetermined value indicating a "latch up" condition in said integrated circuit.

17. In combination with a voltage regulator for generating a regulated output from an input power source connected thereto and an integrated circuit connected to the output of said voltage regulator, an integrated circuit protection device, comprising:

first switching means, connected to said input power source and the input of said voltage regulator, for controlling the input power of said voltage regulator, said first switching means being normally closed when said integrated circuit is operating properly;

second switching means, connected to said first switching means, for controlling the state of said first switching means, said second switching means being normally closed when said integating circuit is operating properly;

third switching means, connected to said input power source and second switching means, responsive to the input to said voltage regulator for detecting a "latch-up" condition of said integrated circuit and for controlling the state of said second switching means, said third switching means being normally open when said integrated circuit is operating properly and being closed when ever "latch-up" condition is detected, whereby the state of said second switching means is changed to open which changes the state of said first switching means to open which causes a zero output from said voltage regulator and clears said integrated circuit of a said "latch-up" condition;

wherein said third switching means includes monitoring means for monitoring the input current to said voltage regulator and closing said third switching means whenever the input current to said voltage regulator excedes a predetermined value indicating a "latch-up" condition in said integrated circuit; and wherein said third switching means includes a delay circuit means, for changing the state thereof to open, a predetermined period of time after the state thereof is changed to closed.

18. A device according to claim 17, further comprising:

filter capacitor means, connected to the output of said voltage regulator;

said predetermined period of time being longer than the time it takes said filter capacitor means to discharge after said "latch up" condition is detected.

19. In combination with a voltage regulator for generating a regulated output from an input power source connected thereto and an integrated circuit connected to the output of said voltage regulator, an integrated circuit protection device, comprising:

first switching means, connected to said input power source and the input of said voltage regulator, for controlling the input power to said voltage regulator, said first switching means being normally closed when said integrated circuit is operating properly;

second switching means, connected to said first switching means, for controlling the state of said of first switching means, said second switching means being normally opened when said integrated circuit is operating properly;

third switching means, connected to said input power source and said second switching means, responsive to the input to said voltage regulator for detecting a "latch-up" condition of said integrated circuit and for controlling the state of said second switching means, said third switching means being normally open when said integrated circuit is operating properly and being closed whenever a "latch-up" condition is detected, whereby the state of said second switching means is changed to open which changes the state of said first switching means to open which causes a zero output from said voltage regulator and clears said integrated circuit of said latch-up condition;

wherein: said first switching means includes a first transistor having a collector connected to the input of said voltage regulator, an emitter connected to said input source through a first resistor, and a base;

said second switching means includes a second transistor having a collector connected to ground through second and third series resistors, an emitter connected to the base of said first transistor and a base connected to the emitter of said first transistor through a fourth resistor; and said third switching means includes a third transistor having a collector connected to ground through a fifth resistor and to the base of said second transistor through a sixth resistor, an emitter connected to said input power source and a base connected to one end of a seventh resistor having its other end connected to the junction of a first resistor and the emitter of said first transistor, the base of said third transistor further being connected to one end of a parallel eighth resistor-first capacitor combination, the other end of which is connected to a diode having its other end connected to the emitter of said first transistor and one end of a second capacitor having its other end connected to the junction of said second and third resistors.

* * * * *